United States Patent Office 3,594,180
Patented July 20, 1971

3,594,180
PROCESS FOR MAKING BREAD
Joseph H. Hulse, Rome, Italy, and Robert E. Hannah, Crystal Beach, Ontario, Canada, assignors to Maple Leaf Mills Limited, Research Div., Toronto, Ontario, Canada
No Drawing. Filed June 3, 1968, Ser. No. 733,757
Claims priority, application Canada, June 14, 1967, 993,027
Int. Cl. A21d 2/04, 2/14
U.S. Cl. 99—90R     5 Claims

ABSTRACT OF THE DISCLOSURE

This invention relates to an improved process for making yeast raised bread products which comprises mixing into a standard dough at least one acid selected from lactic acid, acetic acid, acid phosphates, such as calcium phosphate and sodium acid pyrophosphate, acid tartrates, organic acids such as citric acid, tartaric acid, malic acid, adipic acid, fumaric acid, and glucono delta lactone, at least one compound selected from the bromates of sodium, potassium, and calcium, as a first oxidizing agent, and at least one compound selected from the iodates of sodium, potassium and calcium, acetone peroxide, azodicarbonamide, ascorbic acid, dehydro-ascorbic acid, and calcium peroxide, as a second oxidizing agent for a slightly longer than normal mixing time in a conventional dough mixer. The resulting product requires no fermentation and can be immediately divided, moulded, proofed and baked after mixing and resting.

BACKGROUND OF THE INVENTION

This invention relates to an improved process for making yeast raised bread products in which the fermentation step normally associated with bread making processes has been eliminated.

In the traditional method of bread making (a) all or (b) a portion of the ingredients are mixed and allowed to ferment for periods which vary between 1 and 6 or more hours. (a) is known as a straight dough process and (b) as a sponge and dough process. After the dough has fermented it is then divided, moulded, panned, proofed and baked.

The addition of alkali and alkaline earth metal salts of bromate and iodate together, separately or in combination with other similar chemical agents to the standard bread dough ingredients has long been known. These salts are dough maturing agents which act on the gluten formed from the proteins in the flour to make the dough more elastic and therefore more easily worked.

In Canadian Patent No. 578,200, J. H. Hulse has disclosed a process for making a prepared bread mix in which in addition to the standard dough ingredients of yeast, sugar, shortening, flour, salt, milk and water, there is added lactic acid. The lactic acid creates the same pH conditions in the dough which are present at the end of conventional fermentation periods. This effect appears to substantially eliminate the fermentation period. As a result the bread making time is reduced considerably. The usual dough maturing agents are not included in the ingredients of this prepared mix. The bread mix was actually developed to supply isolated units of the armed forces with bread. The bread is not equal in volume, texture and eating quality to commercial bread and is not considered satisfactory by modern baking companies.

In more recent methods the period of fermentation has been replaced by high energy mixing machines developed specially for the purpose (see U.S. Patent No. 2,953,460).

SUMMARY OF THE INVENTION

We have unexpectedly discovered that when at least one acid selected from lactic acid, acetic acid, acid phosphates such as acid calcium phosphate and sodium acid pyrophosphate, acid tartrates, organic acids such as citric acid, tartaric acid, malic acid, adipic acid, fumaric acid, and glucono delta lactone, at least one compound selected from the bromates of sodium, potassium and calcium, as a first oxidizing agent, and at least one compound selected from the iodates of sodium, potassium and calcium, acetone peroxide, azodicarbonamide, ascorbic acid, dehydro-ascorbic acid, and calcium peroxide, as a second oxidizing agent, and the whole is mixed for a slightly longer than normal mixing time in a conventional dough mixer, a bread dough is produced which requires no fermentation, but can be immediately divided, moulded, proofed and baked after mixing and resting. Compared with present day conventional bread making processes, the process of this invention is shorter by some five and one half to six hours. The resulting products are indistinguishable from those made by conventional bread making processes.

The addition of the acid and oxidizing agents may be made to the flour at the flour mill or incorporated into the dough in the bread making process.

The standard dough referred to here consists of the usual ingredients used for making bread dough, namely flour, yeast, sugar, salt, shortening, skim milk powder and water.

Other conventional additives such as non-diastatic malt syrup, cracked wheat, glycerides and alkali propionates may be included depending on the bread product and the scale of production. The quantity of each ingredient to be added varies with the type of bread dough being made.

The preferred acids of the invention are acetic acid and lactic acid.

The preferred oxidizing agents include the bromates and iodates of sodium, potassium and calcium and azodicarbonamide. In the preferred process of the invention, potassium bromate, calcium iodate and lactic acid, are incorporated into the standard dough or flour.

In the process of the invention from about 0.05 to 0.30 part of acid and a total of oxidizing agent about from 15 to 100 p.p.m. consisting of 5 to 50 p.p.m. of the first oxidizing agent and 10 to 50 p.p.m. of the second oxidizing agent are incorporated into the dough.

DESCRIPTION OF PREFERRED EMBODIMENTS

In a more preferred process of the invention from about 0.10 to 0.25 part of acid and a total of oxidizing agent of from about 30 to 100 p.p.m. consisting of from about 10 to 50 p.p.m. of the first oxidizing agent and from about 20 to 50 p.p.m. of the second oxidizing agent are incorporated into the standard dough or flour.

In the most preferred process of the invention 20 p.p.m. potassium bromate, 25 p.p.m. calcium iodate and 0.20 part lactic acid are incorporated into the standard dough.

The process of the invention is applicable to a variety of bread dough mixes and may be applied to both the straight dough and the sponge and dough processes. The finished baked products are indistinguishable from those made by conventional bread making processes.

The following examples illustrate the various types of bread doughs to which the process of the invention may be applied.

EXAMPLE 1

White pan bread.—100.0 parts bakers patent flour, medium protein content, 3.0 parts yeast, 2.0 parts sugar, 2.0 parts salt, 2.0 parts regular shortening, 2.0 parts skim milk powder, 20 p.p.m. potassium bromate (based on flour) 25 p.p.m. calcium iodate (based on flour), 0.20 part lactic acid and about 66.0 parts water were placed in a mixing bowl. The water temperature was adjusted to give a dough temperature of 90° F. at the end of mixing. The ingredients were mixed in a Hobart mixer using a hook attachment for approximately 12 minutes at second speed. The dough mix was divided, allowed to rest for about 8 to 10 minutes, and then was moulded and panned. The dough was then proofed for 60 minutes at 105°. F. and baked for 30 minutes at 400° F.

EXAMPLE 2

White pan bread.—Illustrating the process in a fully mechanized bakery.

100.0 parts baker's patent flour (medium protein content) 3.0 parts yeast, 2.0 parts sugar, 2.0 parts salt, 2.0 parts regular shortening or lard, 2.0 parts skim milk powder, 0.19 part calcium propionate, 0.31 part mono-di-glycerides, 20 p.p.m. potassium bromate (based on flour), 25 p.p.m. calcium iodate (based on flour), 0.20 part lactic acid, and 67.0 parts water were placed in a Reid Co. High Speed Mixer and mixed (75 to 85 r.p.m.) for 16 minutes. The water temperature was adjusted to give a dough temperature of 90° F. at the end of mixing. After mixing the dough was divided, given an intermediate proof of 7 to 14 minutes, moulded and panned. The dough was then proofed for 60 minutes at 105° F. and baked 20 minutes at 475° F.

EXAMPLE 3

White pan bread.—Illustrating the use of azodicarbonamide.

100.0 parts baker's patent flour, medium protein content, 3.0 parts yeast, 2.0 parts sugar, 2.0 parts salt, 2.0 parts regular shortening or lard, 2.0 parts skim milk powder, 20 p.p.m. potassium bromate (based on flour), 45 p.p.m. azodicarbonamide (based on flour), 0.20 part lactic acid and 66.0 parts water were placed in the mixing bowl of a Hobart mixer. The water temperature was adjusted to give a dough temperature of 90° F. at the end of mixing. The ingredients were mixed in the Hobart mixer, using a hook attachment for approximately 12 minutes at second speed. The dough was divided, was allowed to rest for 8 to 10 minutes and was then moulded and panned. The dough was then proofed for 60 minutes at 105° F. and baked for 30 minutes at 400° F.

EXAMPLE 4

White pan bread.—Illustrating the use of acetic acid and the use of flour containing the oxidizing agents. 100.0 parts baker's patent flour, medium protein content (containing 20 p.p.m. potassium bromate and 25 p.p.m. calcium iodate) 3.0 parts yeast, 2.0 parts sugar, 2.0 parts salt, 2.0 parts regular shortening or lard, 2.0 parts skim milk powder, [1] 0.15 part acetic acid (glacial) and 66.0 parts water were placed in the mixing bowl of a Hobart mixer. The water temperature was adjusted to give a dough temperature of 90° F. at the end of mixing. The ingredients were mixed, using a hook attachment, for approximately 12 minutes at second speed. The dough was divided, was allowed to rest for 8 to 10 minutes and was then moulded and panned. The dough was then proofed for 60 minutes at 105° F. and baked for 30 minutes at 400° F.

EXAMPLE 5

Rolls.—100.0 parts bakers patent flour, medium protein content, 3.0 parts yeast, 12.0 parts sugar, 2.0 parts salt, 8.0 parts regular shortening, 2.0 parts skim milk powder, 20 p.p.m. (based on flour) potassium bromate, 25 p.p.m. (based on flour) calcium iodate, 0.20 part lactic acid and about 60.0 parts water were placed in a mixing bowl. The water temperature was adjusted to give a dough temperature of 90° F. at the end of mixing. The ingredients were mixed in a Hobart mixer using a hook attachment for approximately 12 minutes at second speed. The dough mixture was divided into approximately 2 oz. portions, allowed to rest for 10 minutes and then moulded and panned. The dough was proofed for 60 to 75 minutes at 105° F. and baked for 20 minutes at 400° F.

EXAMPLE 6

Hearth bread.—100.0 parts bakers patent flour, high protein content, 3.0 parts yeast, 1.0 part sugar, 2.0 parts salt, 1.0 part regular shortening, 20 p.p.m. (based on flour) potassium bromate, 25 p.p.m. (based on flour) calcium iodate, 0.20 part lactic acid and approximately 60.0 parts water were placed in a mixing bowl. The water temperature was adjusted to give a dough temperature of 90° F. at the end of mixing. The ingredients were mixed in a Hobart mixer using a hook attachment for about 12 minutes. The dough mixture was divided, allowed to rest for 8 to 10 minutes and was then moulded. The dough was proofed for 60 to 75 minutes at 105° F. and baked for 30 minutes at 400° F.

EXAMPLE 7

Hearth bread.—Illustrating the process in a semi-mechanized plant. 100.0 parts bakers patent flour, high protein content, 3.0 parts yeast, 1.0 part non-diastatic malt, 2.0 parts salt, 1.0 part regular shortening, 20 p.p.m. potassium bromate (based on flour) 25 p.p.m. calcium iodate (based on flour), 0.20 part lactic acid and 52.0 parts water were placed in the mixing bowl. The water temperature was adjusted to give a dough temperature of 90° F. at the end of mixing. The ingredients were mixed in an Artofex mixer for 35 minutes. The dough was immediately divided, was allowed to rest for 10 to 20 minutes and was moulded and panned. The dough was proofed for 90 minutes at 82° F. and baked for 50 minutes at 375° F.

EXAMPLE 8

Whole wheat bread.—40.0 parts bakers patent flour, medium protein content, 60.0 parts whole wheat flour, 3.0 parts yeast, 2.0 parts sugar, 2.0 parts salt, 3.0 parts regular shortening, 2.0 parts skim milk powder, 2.0 parts non-diastatic malt syrup, 20 p.p.m. (based on flour) potassium bromate, 25 p.p.m. calcium iodate (based on flour), 0.20 part lactic acid and approximately 66.0 parts water were placed in a mixing bowl. The water temperature was adjusted to give a dough temperature of 90° F. at the end of mixing. The ingredients were mixed in a Hobart mixer using a hook attachment for about 15 minutes at second speed. The dough mix was divided, allowed to rest for from 8 to 10 minutes and then was moulded and panned. The dough was then proofed for 60 minutes at 105° F. and baked for 30 minutes at 400° F.

EXAMPLE 9

Cracked wheat bread.—100.0 parts bakers patent flour, medium protein content, 20.0 parts cracked wheat, 3.0 parts yeast, 2.0 parts sugar, 2.25 parts salt, 2.5 parts regular shortening, 2.0 parts skim milk powder, 20 p.p.m. potassium bromate (based on flour), 25 p.p.m. calcium iodate (based on flour), 0.20 part lactic acid and approximately 65.0 parts water were placed in a mixing bowl. The water temperature was adjusted to give a dough temperature of 90° F. at the end of mixing. The cracked wheat was previously soaked for 2 hours in a portion of the total water and then mixed with the other ingredients in a Hobart mixer using a hook attachment for approximately 18 minutes at second speed. The dough mix was divided, allowed to rest for 10 minutes, and then it was moulded and panned. The dough was then proofed for 60 minutes at 105° F. and baked for 30 minutes at 400° F.

EXAMPLE 10

Sweet dough.—100.0 parts bakers patent flour, medium protein content, 4.0 parts yeast, 10.0 parts sugar, 2.0 parts

---

[1] The acetic acid need not be 100%. Aqueous solutions of acetic acid may be used in which case the amount used should supply the equivalent of 0.15 part of glacial acetic acid and the water should be reduced proportionately.

salt, 20.0 parts high emulsifier shortening, 4.0 parts skim milk powder, 4.0 parts non-diastatic malt syrup, 15.0 parts fresh eggs. 20 p.p.m. (based on flour) potassium bromate, 25 p.p.m. (based on flour) calcium iodate, 0.20 part lactic acid and approximately 48.0 parts water were placed in a mixing bowl. The water temperature was adjusted to give a dough temperature of 90° F. at the end of mixing. The ingredients were mixed in a Hobart mixer using a hook attachment for approximately 12 minutes at second speed. The dough mix was divided, allowed to rest for about 10 minutes, and then it was moulded and panned. The dough was then proofed for 75 minutes at 105° F. and baked for a variable period of time depending on the type of product.

We claim:

1. In a process for making yeast raised bread products which includes the steps of preparing a standard dough mixture, dividing said standard dough mixture into units, allowing the divided mixture to rest, molding said divided mixture, proofing said molded, divided mixture, and baking said molded, divided mixture, the improvement whereby a fermentation step between preparing the mixture and dividing is substantially eliminated which comprises incorporating into the standard dough mixture before dividing:

from about 0.05 to about 0.30 part per 100 parts of flour of at least one acid selected from the group consisting of acetic acid and lactic acid, from about 10 to about 50 p.p.m. of at least one bromate selected from the bromates of sodium, potassium and calcium as a first oxidizing agent, and from about 20 to 50 p.p.m. of at least one compound selected from the iodates of sodium, potassium or calcium and azodicarbonamide as a second oxidizing agent, the total oxidizing agent being from 30 to 100 p.p.m.

2. A process as claimed in claim 1 wherein the acid, first oxidizing agent and second oxidizing agent are incorporated into the flour prior to mixing with the other standard dough ingredients.

3. A process as claimed in claim 1 wherein from about 0.10 to 0.25 part of acid are incorporated into the standard dough.

4. A process as claimed in claim 1 wherein lactic acid, potassium bromate and calcium iodate are used.

5. A process as calimed in claim 4 wherein 0.20 part lactic acid per 100 parts of flour, 20 p.p.m. potassium bromate and 25 p.p.m. calcium iodate are used.

References Cited

UNITED STATES PATENTS

| | | | |
|---|---|---|---|
| 1,936,636 | 11/1933 | MacIntosh | 99—91 |
| 2,903,361 | 9/1959 | Marks et al. | 99—91X |
| 2,941,887 | 6/1960 | Findley et al. | 99—91 |
| 3,304,183 | 2/1967 | Johnston et al. | 99—91X |

OTHER REFERENCES

Bayfield et al., "Flour Brew Studies," The Bakers Digest, February 1962, pages 34–38, 77

RAYMOND N. JONES, Primary Examiner

J. R. HOFFMAN, Assistant Examiner

U.S. Cl. X.R.

99—91